(12) United States Patent
Thomas

(10) Patent No.: US 9,475,256 B2
(45) Date of Patent: Oct. 25, 2016

(54) COMPOSITE FILLER

(71) Applicant: The Boeing Company, Chicago, IL (US)

(72) Inventor: Charles William Thomas, Issaquah, WA (US)

(73) Assignee: THE BOEING COMPANY, Chicago, IL (US)

(*) Notice: Subject to any disclaimer, the term of this patent is extended or adjusted under 35 U.S.C. 154(b) by 5 days.

(21) Appl. No.: 14/327,600

(22) Filed: Jul. 10, 2014

(65) Prior Publication Data
US 2016/0009045 A1    Jan. 14, 2016

(51) Int. Cl.
| B29C 70/30 | (2006.01) |
| B32B 5/02 | (2006.01) |
| B29C 65/00 | (2006.01) |
| B64C 1/00 | (2006.01) |
| B32B 5/12 | (2006.01) |
| B32B 5/26 | (2006.01) |
| B29C 65/48 | (2006.01) |
| B29C 65/50 | (2006.01) |
| B29C 70/08 | (2006.01) |
| B29L 31/30 | (2006.01) |

(52) U.S. Cl.
CPC ........... *B32B 5/024* (2013.01); *B29C 65/4835* (2013.01); *B29C 65/5021* (2013.01); *B29C 65/5035* (2013.01); *B29C 65/5057* (2013.01); *B29C 65/5071* (2013.01); *B29C 66/543* (2013.01); *B29C 66/721* (2013.01); *B29C 66/72141* (2013.01); *B32B 5/12* (2013.01); *B32B 5/26* (2013.01); *B64C 1/00* (2013.01); *B29C 66/43441* (2013.01); *B29C 66/7394* (2013.01); *B29C 70/08* (2013.01); *B29L 2031/3082* (2013.01); *B32B 2260/023* (2013.01); *B32B 2260/046* (2013.01); *B32B 2307/51* (2013.01); *B32B 2307/54* (2013.01); *B32B 2307/736* (2013.01); *B32B 2605/18* (2013.01)

(58) Field of Classification Search
CPC . B29C 66/72141; B29C 66/721; B32B 3/26; B32B 3/266
See application file for complete search history.

(56) References Cited

U.S. PATENT DOCUMENTS

| 3,810,805 A | * | 5/1974 | Goldsworthy et al. | B29C 70/388 156/271 |
| 4,109,435 A | * | 8/1978 | Loyd | B29C 65/562 156/92 |
| 4,256,790 A | * | 3/1981 | Lackman | B29C 66/112 156/93 |
| 4,559,005 A | * | 12/1985 | Gants | B29C 70/504 425/363 |
| 4,778,545 A | * | 10/1988 | Von Derau | B29D 99/0003 156/201 |
| 4,789,594 A | * | 12/1988 | Stawski | B26D 1/02 156/222 |
| 4,913,910 A | | 4/1990 | McCarville et al. | |
| 5,639,535 A | * | 6/1997 | McCarville | B29C 70/30 156/182 |
| 5,789,061 A | * | 8/1998 | Campbell | B29C 65/564 156/73.1 |

(Continued)

FOREIGN PATENT DOCUMENTS

GB    2105254 A  *  3/1983  ........... B29C 70/865

OTHER PUBLICATIONS

Chapman et al., "Composite Filler," U.S. Appl. No. 14/182,474, filed Feb. 18, 2014, 42 pages.

*Primary Examiner* — William Bell
(74) *Attorney, Agent, or Firm* — Yee & Associates, P.C.

(57) ABSTRACT

A method and apparatus is presented. The composite filler comprises a number of layers of composite material and a core comprising a material which is non-bondable with the composite material.

9 Claims, 13 Drawing Sheets

(56) References Cited

U.S. PATENT DOCUMENTS

| | | | |
|---|---|---|---|
| 6,217,000 B1* | 4/2001 | Younie | B29C 33/38 244/123.1 |
| 6,231,941 B1* | 5/2001 | Cundiff | B29C 70/083 428/36.3 |
| 6,689,448 B2 | 2/2004 | George et al. | |
| 6,709,538 B2 | 3/2004 | George et al. | |
| 8,591,685 B2 | 11/2013 | Anderson et al. | |
| 2002/0031641 A1* | 3/2002 | George | B32B 5/12 428/105 |
| 2004/0151878 A1* | 8/2004 | Mead | B32B 7/12 428/156 |
| 2007/0208447 A1* | 9/2007 | Ostrega | B29C 67/0066 700/118 |
| 2009/0317587 A1* | 12/2009 | Deobald | B29C 70/865 428/119 |
| 2011/0139932 A1* | 6/2011 | Matheson | B64C 3/182 244/132 |
| 2012/0074265 A1* | 3/2012 | Hallander | B29C 66/721 244/90 R |
| 2012/0291285 A1* | 11/2012 | Kamaraj | B29C 70/34 29/897.2 |
| 2012/0292446 A1* | 11/2012 | Kamaraj | B29C 70/34 244/129.1 |
| 2012/0308817 A1* | 12/2012 | Ponsolle | B29C 70/222 428/365 |
| 2013/0004715 A1* | 1/2013 | Jarmon | B29C 70/24 428/156 |
| 2013/0062808 A1* | 3/2013 | Bremmer | B29C 70/545 264/163 |
| 2013/0105072 A1* | 5/2013 | Anderson | B29C 70/526 156/264 |
| 2013/0316131 A1* | 11/2013 | Oefner | B29D 99/0014 428/121 |
| 2014/0034236 A1* | 2/2014 | Guzman | B29C 70/52 156/324 |
| 2014/0216638 A1* | 8/2014 | Vetter | B29D 99/0014 156/227 |
| 2015/0125655 A1* | 5/2015 | Kajita | B64C 1/064 428/136 |
| 2015/0217508 A1* | 8/2015 | Rossi | B29D 99/0007 428/80 |
| 2015/0231848 A1* | 8/2015 | Chapman | B32B 1/00 428/174 |
| 2015/0231849 A1* | 8/2015 | Chapman | B32B 1/00 428/77 |
| 2015/0283764 A1* | 10/2015 | McCarville | B29C 70/30 428/161 |
| 2015/0367619 A1* | 12/2015 | Butler | B29C 70/545 428/57 |
| 2016/0009035 A1* | 1/2016 | Zarfos | B29C 70/74 219/634 |

* cited by examiner

COMPOSITE FILLER

BACKGROUND INFORMATION

1. Field

The present disclosure generally relates to composite structures and, in particular, to the fabrication of composite structures. Still more particularly, the present disclosure relates to a method and apparatus for producing composite fillers used to fill gaps in composite structures.

2. Background

Aircraft are being designed and manufactured with greater and greater percentages of composite materials. Composite materials are used in aircraft to decrease the weight of the aircraft. This decreased weight improves performance features such as payload capacities and fuel efficiencies. Further, composite materials provide longer service life for various components in an aircraft.

Composite materials are tough, lightweight materials created by combining two or more functional components. For example, a composite material may include reinforcing fibers bound in polymer resin matrix. The fibers may be unidirectional or may take the form of a woven cloth or fabric. In thermoset composites, fibers and resins are arranged and cured to form a composite material.

When composite structural members are joined together, gaps or voids may be present along bond lines between the members which may need to be filled in order to increase the strength of the bond. For example, in the aircraft industry, composite fuselage stiffeners such as stringers may include a composite filler at the radius bond line between the stringer and a fuselage skin. The composite filler is applied in the form of triangular cross-section strips, sometimes referred to as noodles or fillers, which fill the voids at the bond line. The composite filler may be formed from composite materials such as adhesive or prepreg tape.

These fillers may be prone to cracking. Cracking undesirably reduces the performance of the resulting composite structure. Increasing the cross-section of a filler may increase the propensity to crack.

Therefore, it would be desirable to have a method and apparatus that take into account at least some of the issues discussed above, as well as other possible issues. Specifically, one issue is to find a method and assembly for preventing cracking in composite fillers.

SUMMARY

An illustrative embodiment of the present disclosure provides a composite filler. The composite filler comprises a number of layers of composite material and a core comprising a material which is non-bondable with the composite material.

Another illustrative embodiment of the present disclosure provides a method. A layup comprising a number of layers of composite material and a core comprising a material which is non-bondable with the composite material is formed. The layup is shaped into a substantially triangular cross-section to form a composite filler. The composite filler is placed within a gap formed by a number of composite members. The composite filler and the number of composite members are cured.

Yet another illustrative embodiment of the present disclosure provides a method. A number of composite layers is wrapped around a core to form a wrapped core. The wrapped core is placed onto a base. A number of buildups is placed adjacent to the wrapped core. A number of charges is placed over at least a portion of the base and at least a portion of the wrapped core.

A further illustrative embodiment of the present disclosure provides a composite filler. The composite filler comprises a number of layers of composite material, and a hole extending longitudinally through a cross-section of the composite filler.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that cracking of a composite filler may result from tensile forces within a filler. These tensile forces may be caused by a differential coefficient of thermal expansion between the different directions within the composite material. Specifically, shrinkage of the composite material may be different along the direction of the fibers in the composite material. The tensile forces may effectively "pull" the filler apart.

The illustrative examples further recognize and take into account that reducing cracking in composite fillers may improve structural performance. The illustrative examples also recognize and take into account that reducing cracking in composite fillers may reduce cost by reducing instances of rework or replacement of cracked composite fillers.

Figure 1:
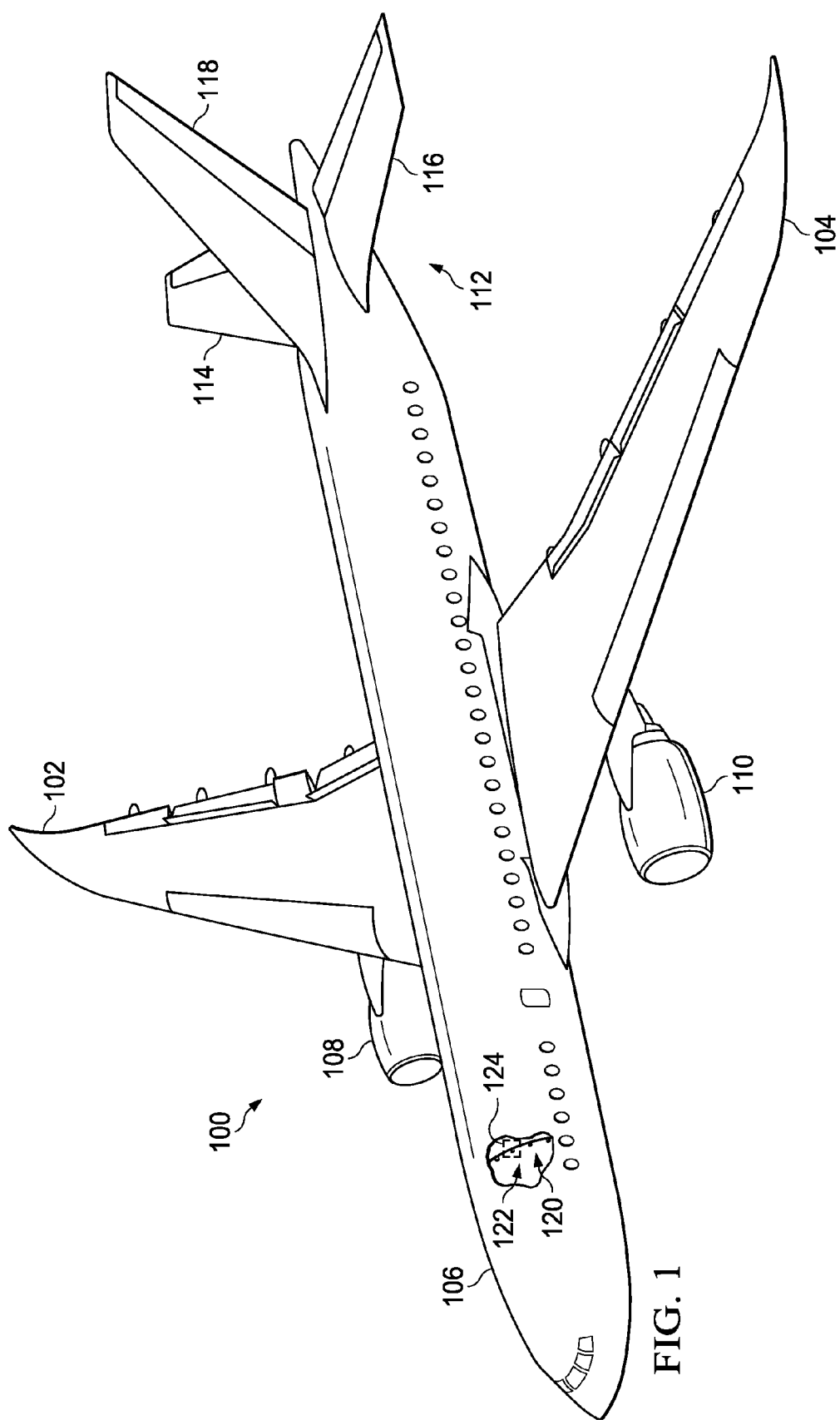
FIG. 1 is an illustration of an aircraft in which an illustrative embodiment may be implemented.

With reference now to the figures, and in particular, with reference to FIG. 1, an illustration of an aircraft is depicted in which an illustrative embodiment may be implemented. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which a composite filler may be implemented in accordance with an illustrative embodiment. For example, composite fillers may be placed between stiffeners 120 and composite skin 122 of aircraft 100. FIG. 1 depicts an exposed view of stiffeners 120, including stiffener 124.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable types of aircraft.

Figure 2:
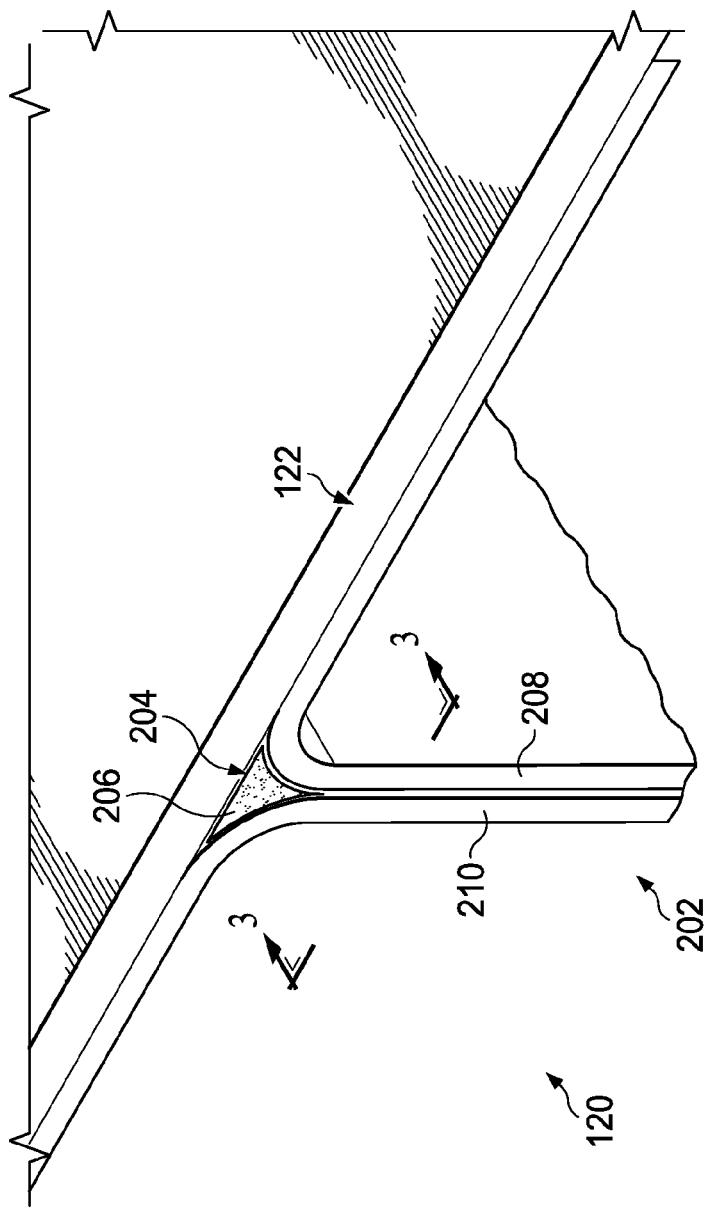
FIG. 2 is an illustration of an isometric view of a composite filler and a number of composite members in accordance with an illustrative embodiment.

Turning now to FIG. 2, an illustration of an isometric view of a composite filler and a number of composite members is depicted in accordance with an illustrative embodiment. Specifically, FIG. 2 is an enlarged view of stiffener 202 of stiffeners 120 in section 2-2 of FIG. 1. As depicted, composite filler 204 is placed in gap 206 formed by stiffener 202 and composite skin 122. In this illustrative example, composite filler 204 has a substantially triangular cross-section. Composite skin 122 is a composite member. Stiffener 202 is also a composite member. As depicted, stiffener 202 is formed by two composite members, composite member 208 and composite member 210. In some illustrative examples, stiffener 202 may instead be more or less than two composite members. In some illustrative examples, stiffener 202 is a composite stringer. In these illustrative examples, the composite stringer may be formed of a single composite member.

Figure 3:
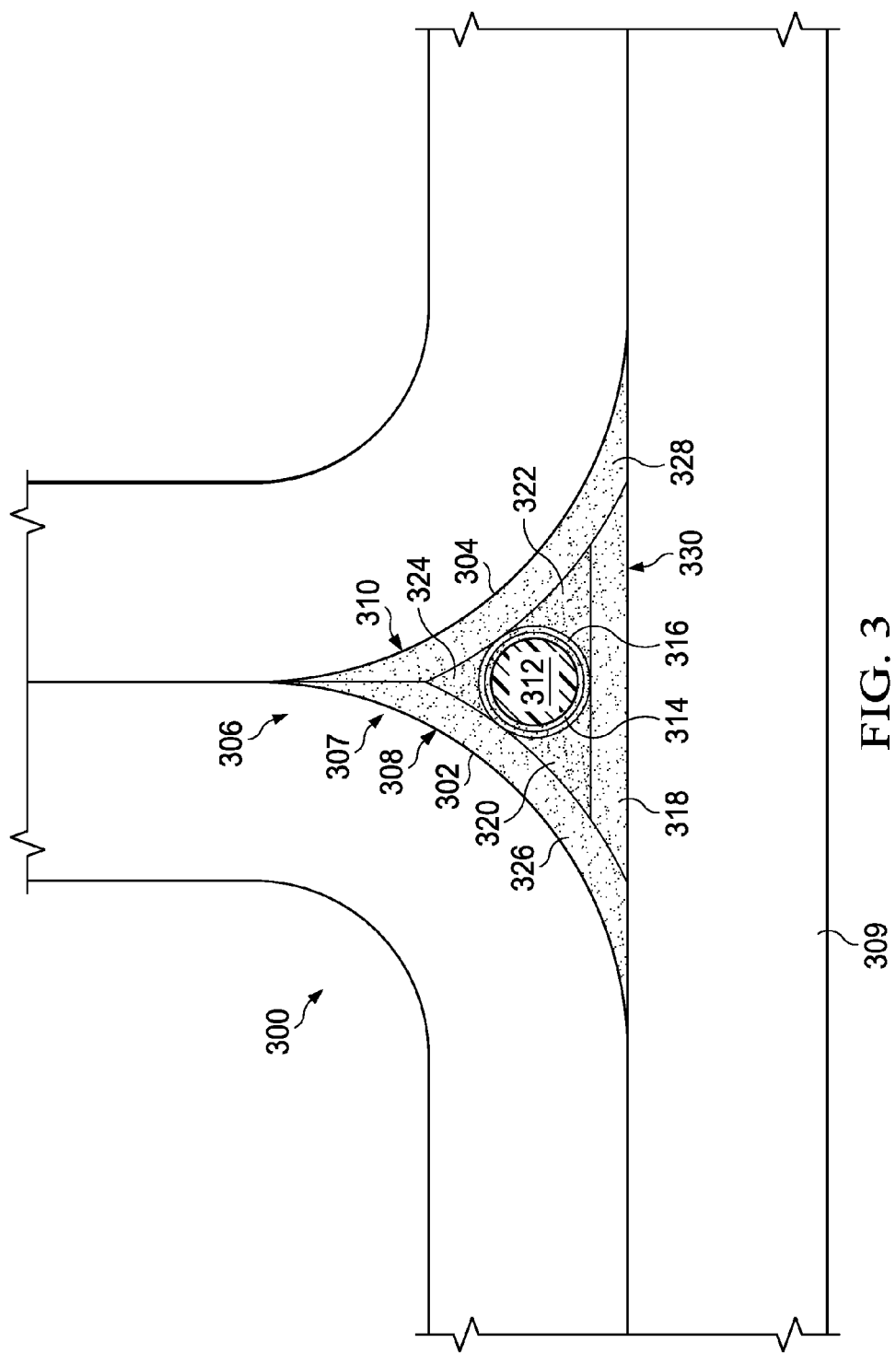
FIG. 3 is an illustration of a front view of a composite filler and a number of composite members in accordance with an illustrative embodiment.

Turning now to FIG. 3, an illustration of a front view of a composite filler and a number of composite members is depicted in accordance with an illustrative embodiment. Specifically, FIG. 3 may be a view of stiffener 202, composite filler 204, and composite skin 122 prior to curing from direction 3-3 of FIG. 2.

Composite member 300 has radius 302 and radius 304. Composite member 300 may be an example of stiffener 202 of FIG. 2. Composite filler 306 is placed in gap 307 formed by composite member 300 and composite member 309. Composite filler 306 has first side 308 and second side 310. First side 308 of composite filler 306 follows radius 302. Second side 310 of composite filler 306 follows radius 304.

Composite filler 306 may be an example of composite filler 204 in FIG. 2. Composite filler 306 is formed of core 312, first wrap 314, second wrap 316, base 318, first buildup 320, second buildup 322, third buildup 324, first charge 326, and second charge 328. In this illustrative example, first charge 326 forms first side 308 and second charge 328 forms second side 310.

As depicted, core 312 has a substantially circular cross-section. The cross-section of core 312 may be selected to reduce the formation of stresses with composite filler 306. Further, the cross-section of core 312 may be selected to reduce adherence of first wrap 314 following curing.

Core 312 is formed of a different material than the remainder of composite filler 306. Specifically, core 312 may be formed of a material selected to not bond with the remainder of composite filler 306. This material may be referred to as a non-bondable material. In one illustrative example, the non-bondable material forming core 312 is TEFLON® (polytetrafluoroethylene). Further, core 312 is formed of a material selected to withstand the cure temperatures of first wrap 314, second wrap 316, base 318, first buildup 320, second buildup 322, third buildup 324, first charge 326, and second charge 328. Yet further, core 312 may be formed of a material selected to withstand the cure temperatures of composite member 300 and composite member 309.

First wrap 314 and second wrap 316 surround core 312 forming a wrapped core. First wrap 314 is a composite material spirally wrapped around core 312. As depicted, first wrap 314 directly contacts core 312. In other illustrative examples, a number of layers may be between first wrap 314 and core 312. In one example, first wrap 314 contacts a peel ply or other non-bondable material which substantially surrounds core 312.

In some illustrative examples, first wrap 314 is a composite fabric spirally wrapped around core 312. In one example, first wrap 314 may be a −45 degree wrap. Specifically, in this example, first wrap 314 may be a woven composite fabric spirally wrapped at a −45 degree angle around core 312. In another illustrative example, first wrap 314 may be a unidirectional material wrapped spirally around core 312.

By spirally wrapping first wrap 314 around core 312, cracks may be discouraged. Specifically, wrapping first wrap 314 around core 312 may reduce the likelihood that cracks may form in composite filler 306. By spirally wrapping first wrap 314 around core 312, any stress concentrations adjacent to core 312 will be discouraged from initiating cracks by the layers of continuous composite fibers contained in first wrap 314.

When first wrap 314 is a woven composite fabric, this woven material may further discourage cracks from forming. Woven composite fabrics have a lower modulus of elasticity than non-woven composite materials. This lower modulus of elasticity may also be referred to as the woven composite fabric being structurally "softer." This lower modulus of elasticity may allow for a greater amount of distortion in first wrap 314 prior to the initiation of cracks. This lower modulus of elasticity of the woven material may result in a "spring effect." A "spring effect" may allow strain from thermal and chemical shrinkage effects to be absorbed without causing the initiation of a crack. Further, this lower modulus of elasticity may allow for a greater amount of distortion in composite filler 306 prior to the initiation of cracks.

In some illustrative examples, second wrap 316 is a composite fabric spirally wrapped around first wrap 314 and core 312. In one example, second wrap 316 may be a +45 degree wrap. Specifically, in this example, second wrap 316 may be a woven composite fabric spirally wrapped at a +45 degree angle around core 312. In another illustrative example, second wrap 316 may be a unidirectional material wrapped spirally around core 312.

As depicted, composite filler 306 is uncured. In an uncured state, first wrap 314 contacts core 312. During curing, core 312 expands and applies pressure to first wrap 314, second wrap 316, base 318, first buildup 320, second buildup 322, third buildup 324, first charge 326, and second charge 328. Core 312 shrinks as core 312 cools after curing. First wrap 314 is restricted from shrinking by at least one of the cured resin or the fiber direction of the composite material. As a result, after curing, a gap exists between first wrap 314 and core 312.

As used herein, the phrase "at least one of," when used with a list of items, means different combinations of one or more of the listed items may be used and only one of each item in the list may be needed. In other words, "at least one of" means any combination of items and number of items may be used from the list but not all of the items in the list are required. The item may be a particular object, thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

In some illustrative examples, core 312 may be removed after curing. Removing core 312 reduces the weight of composite filler 306.

Base 318 forms a portion of third side 330. Base 318 is formed of a plurality of composite layers. The plurality of composite layers may have one or more ply orientations. Specifically, the plurality of composite layers may have at least one of 0 degree plies, +/−10 degree plies, +/−15 degree plies, +/−30 degree plies, +/−45 degree plies, +/−60 degree plies, +/−75 degree plies, or +/−90 degree plies. In some illustrative examples, base 318 may be formed of a composite laminate stack.

First buildup 320 is positioned on base 318 and adjacent to core 312. First buildup 320 contacts first charge 326. First buildup 320 may be formed of a unidirectional composite material. In one illustrative example, the unidirectional fibers are substantially directed into the page in FIG. 3. In other words, the fibers of the unidirectional composite material are substantially parallel to the longitudinal axis of composite filler 306. In some illustrative examples, first buildup 320 may be formed by rolling a unidirectional tape in a jellyroll fashion. In other words, first buildup 320 may be formed by rolling a unidirectional tape into a spiral type cross-section. In some illustrative examples, first buildup 320 is a unidirectional extruded material.

Second buildup 322 is positioned on base 318 and adjacent to core 312. Second buildup 322 contacts second charge 328. Second buildup 322 may be formed of a unidirectional composite material. Like first buildup 320, in some illustrative examples, second buildup 322 is formed by rolling a unidirectional tape in a jellyroll fashion. In some illustrative examples, second buildup 322 is a unidirectional extruded material.

Third buildup 324 is positioned on second wrap 316 and contacting both first charge 326 and second charge 328. Third buildup 324 may be formed of a unidirectional composite material. Like first buildup 320, in some illustrative examples, third buildup 324 is formed by rolling a unidirectional tape in a jellyroll fashion. In some illustrative examples, third buildup 324 is a unidirectional extruded material.

First charge 326 is positioned adjacent to first buildup 320 and third buildup 324. First charge 326 is also adjacent to radius 302 of composite member 300. First charge 326 is also adjacent to base 318. First charge 326 is formed of a plurality of composite layers. The plurality of composite layers may have one or more ply orientations. Specifically, the plurality of composite layers may have at least one of 0 degree plies, +/−10 degree plies, +/−15 degree plies, +/−30 degree plies, +/−45 degree plies, +/−60 degree plies, +/−75 degree plies, or +/−90 degree plies. In some illustrative examples, first charge 326 may be formed of a composite laminate stack.

First charge 326 forms first side 308. First side 308 follows radius 302. As a result, the fibers of first charge 326 are substantially in plane with radius 302.

Second charge 328 is positioned adjacent to second buildup 322 and third buildup 324. First charge 326 is also adjacent to radius 304 of composite member 300. Second charge 328 is also adjacent to base 318. Second charge 328 is formed of a plurality of composite layers. The plurality of composite layers may have one or more ply orientations. Specifically, the plurality of composite layers may have at least one of 0 degree plies, +/−10 degree plies, +/−15 degree plies, +/−30 degree plies, +/−45 degree plies, +/−60 degree plies, +/−75 degree plies, or +/−90 degree plies. In some illustrative examples, second charge 328 may be formed of a composite laminate stack.

Second charge 328 forms second side 310. Second side 310 follows radius 304. As a result, the fibers of second charge 328 are substantially in plane with radius 304.

The illustration of composite filler 306 in FIG. 3 is not meant to imply physical or architectural limitations to the manner in which an illustrative embodiment may be implemented. Other components in addition to or in place of the ones illustrated may be used. Some components may be unnecessary.

For example, composite filler 306 may have a cross-section that is not substantially triangular. Further, core 312 may be formed of a material other than a non-bondable material. In some examples, core 312 may be covered in a non-bondable material. In these examples, first wrap 314 may directly contact this non-bondable material rather than core 312.

As another example, composite filler 306 may have greater or fewer numbers of buildups other than first buildup 320, second buildup 322, and third buildup 324. Further, one of first buildup 320, second buildup 322, and third buildup 324 may be formed from a non-unidirectional composite material.

Figure 4:
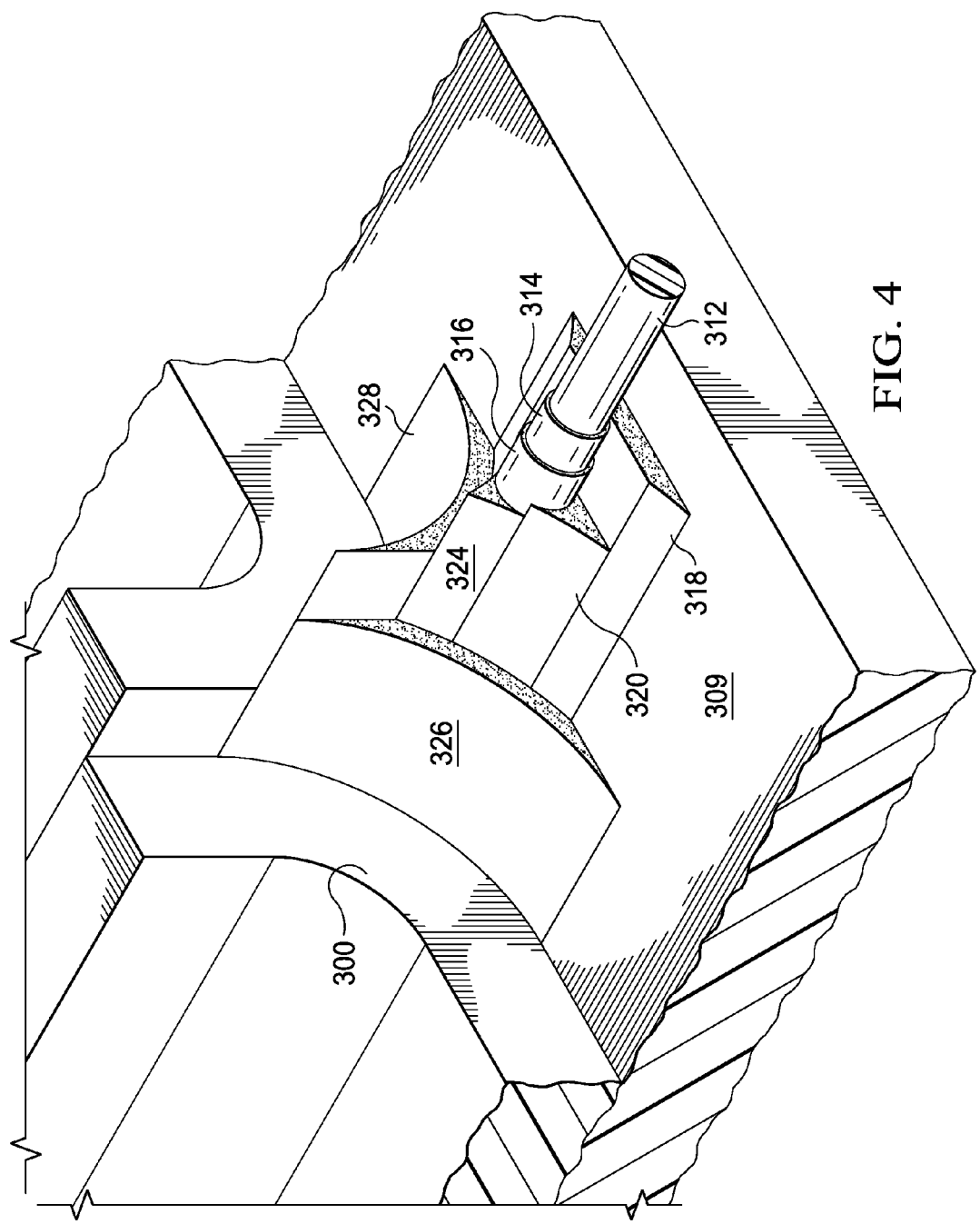
FIG. 4 is an illustration of a cut-away view of a composite filler and a number of composite members in accordance with an illustrative embodiment.

Turning now to FIG. 4, an illustration of a cut-away view of a composite filler and a number of composite members is depicted in accordance with an illustrative embodiment. Specifically, FIG. 4 is a cut-away view of composite member 300, composite filler 306, and composite member 309 of FIG. 3.

Figure 5:
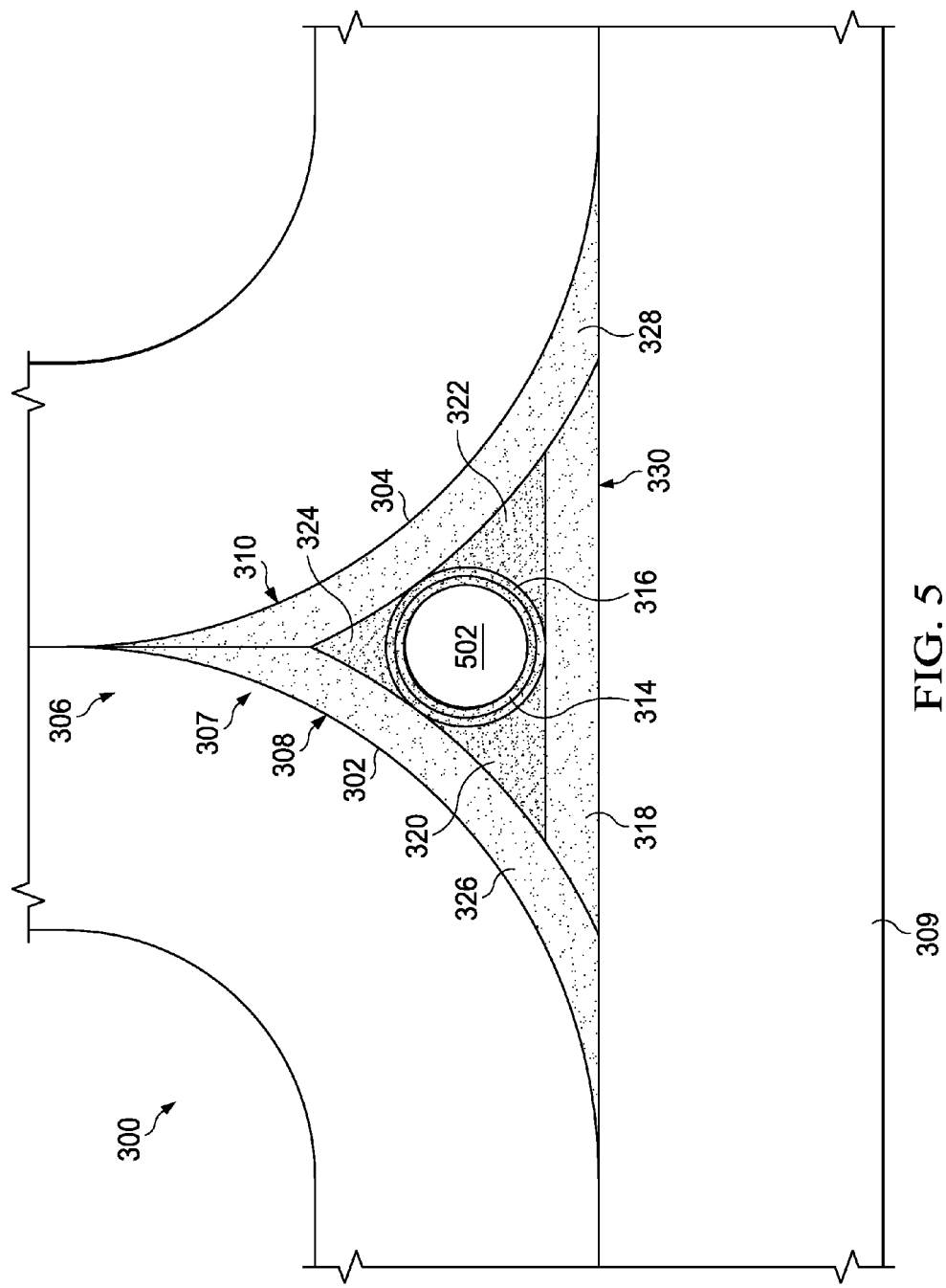
FIG. 5 is an illustration of a front view of a cured composite filler and a number of composite members in accordance with an illustrative embodiment.

Turning now to FIG. 5, an illustration of a front view of a cured composite filler and a number of composite members is depicted in accordance with an illustrative embodiment. Specifically, FIG. 5 is a view of composite member 300, composite filler 306, and composite member 309 of FIG. 3 after curing.

As can be seen from FIG. 5, core 312 has been removed from composite filler 306 following curing. Removing core 312 leaves hole 502 in center of composite filler 306. By removing core 312, weight of composite filler 306 may be reduced.

As depicted, hole 502 has a substantially circular cross-section. Further, hole 502 extends longitudinally through composite filler 306 and into the page, and thus may be substantially cylindrically shaped. The fiber orientation of at least one of first wrap 314 and second wrap 316 may discourage development of cracks along hole 502 in composite filler 306.

Figure 6:
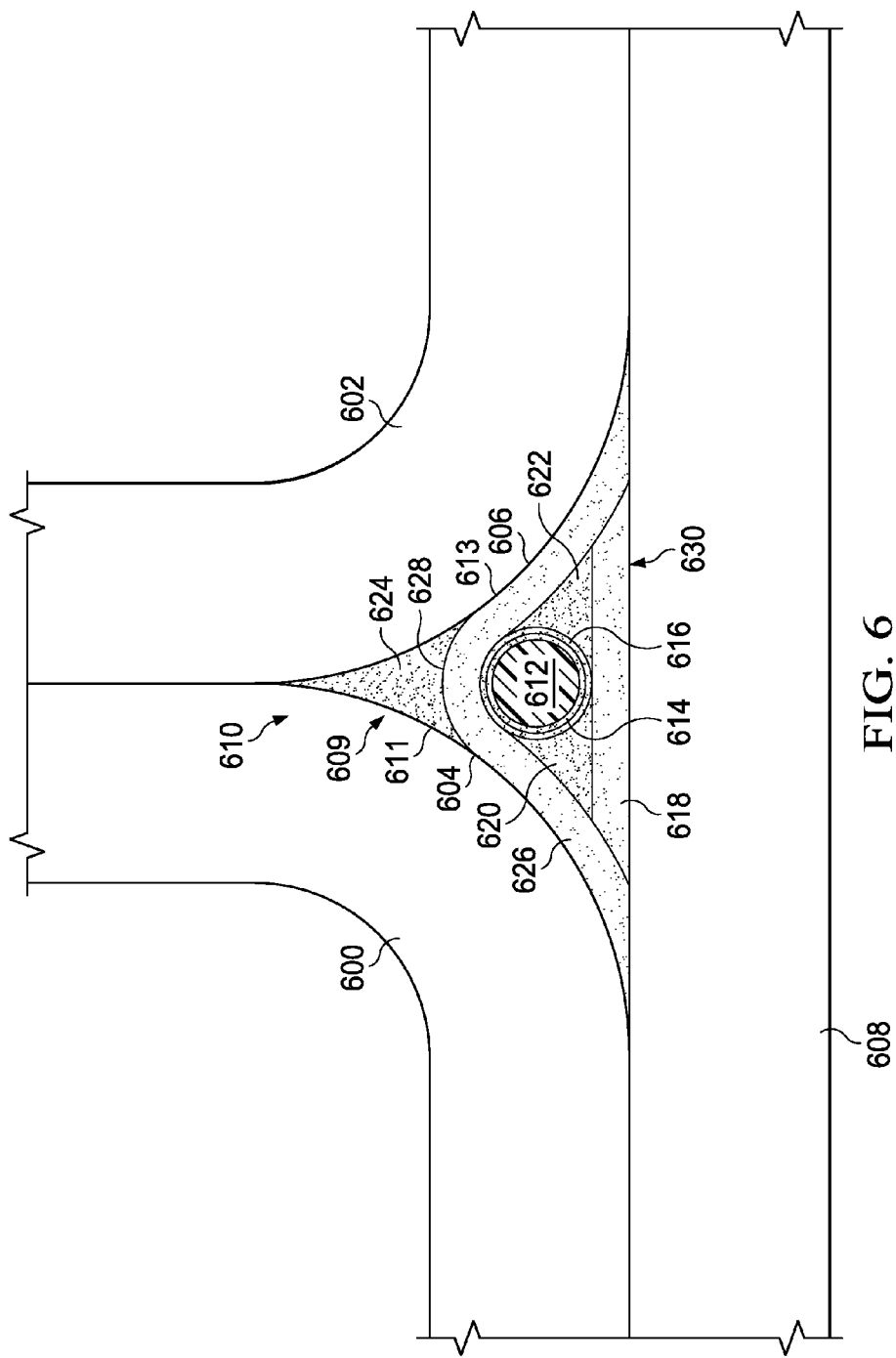
FIG. 6 is an illustration of a front view of a composite filler and a number of composite members in accordance with an illustrative embodiment.

Turning now to FIG. 6, an illustration of a front view of a composite filler and a number of composite members is depicted in accordance with an illustrative embodiment. Specifically, FIG. 6 is a view of two stiffeners, a composite filler, and a composite skin.

Composite member 600 and composite member 602 have radius 604 and radius 606 respectively. Composite member 600 may be an example of a stiffener. Composite member 602 may also be an example of a stiffener. Composite member 608 may be a composite skin. Composite member 600, composite member 602, and composite member 608 form gap 609. Composite filler 610 is placed in gap 609.

Composite filler 610 has first side 611 and second side 613. First side 611 of composite filler 610 follows radius 604. Second side 613 of composite filler 610 follows radius 606.

Composite filler 610 may be an example of composite filler 204 in FIG. 2. Composite filler 610 is formed of core 612, first wrap 614, second wrap 616, base 618, first buildup 620, second buildup 622, third buildup 624, and charge 626. In this illustrative example, charge 626 forms portions of first side 611 and second side 613.

As depicted, core 612 has a substantially circular cross-section. The cross-section of core 612 may be selected to reduce the formation of stresses with composite filler 610. Further, the cross-section of core 612 may be selected to reduce adherence of first wrap 614 following curing.

Core 612 is formed of a different material than the remainder of composite filler 610. Specifically, core 612 may be formed of a material selected to not bond with the remainder of composite filler 610. In one illustrative example, the non-bondable material forming core 612 is TEFLON® (polytetrafluoroethylene). Further, core 612 is formed of a material selected to withstand the cure temperatures of first wrap 614, second wrap 616, base 618, first buildup 620, second buildup 622, third buildup 624, and charge 626. Yet further, core 612 may be formed of a material selected to withstand the cure temperatures of composite member 600, composite member 602, and composite member 608.

First wrap 614 and second wrap 616 surround core 612 forming a wrapped core. First wrap 614 is a composite material spirally wrapped around core 612. In some illustrative examples, first wrap 614 is a composite fabric spirally wrapped around core 612. In one example, first wrap 614 may be a −45 degree wrap. Specifically, in this example, first wrap 614 may be a woven composite fabric spirally wrapped at a −45 degree angle around core 612. In another illustrative example, first wrap 614 may be a unidirectional material wrapped spirally around core 612.

By spirally wrapping first wrap 614 around core 612, cracks may be discouraged. By spirally wrapping first wrap 614 around core 612, any stress concentrations adjacent to core 612 will be discouraged from initiating cracks by the layers of continuous composite fibers contained in first wrap 614.

When first wrap 614 is a woven composite fabric, this woven material may further discourage cracks from forming. Woven composite fabrics have a lower modulus of elasticity than non-woven composite materials. This lower modulus of elasticity may also be referred to as the woven composite fabric being structurally "softer." This lower modulus of elasticity may allow for a greater amount of distortion in first wrap 614 prior to the initiation of cracks. This lower modulus of elasticity of the woven material may result in a "spring effect." A "spring effect" may allow strain from thermal and chemical shrinkage effects to be absorbed without causing the initiation of a crack. Further, this lower modulus of elasticity may allow for a greater amount of distortion in composite filler 610 prior to the initiation of cracks.

In some illustrative examples, second wrap 616 is a composite fabric spirally wrapped around first wrap 614 and core 612. In one example, second wrap 616 may be a +45 degree wrap. Specifically, in this example, second wrap 616 may be a woven composite fabric spirally wrapped at a +45 degree angle around core 612. In another illustrative example, second wrap 616 may be a unidirectional material wrapped spirally around core 612.

As depicted, composite filler 610 is uncured. In an uncured state, first wrap 614 contacts core 612. During curing, core 612 expands and applies pressure to first wrap 614, second wrap 616, base 618, first buildup 620, second buildup 622, third buildup 624, and charge 626. Core 612 shrinks as core 612 cools after curing. First wrap 614 is restricted from shrinking by at least one of the cured resin and the fiber direction of the composite material. As a result, after curing, a gap exists between first wrap 614 and core 612.

In some illustrative examples, core 612 may be removed after curing. Removing core 612 reduces the weight of composite filler 610.

Base 618 forms a portion of third side 630. Base 618 is formed of a plurality of composite layers. The plurality of composite layers may have one or more ply orientations. Specifically, the plurality of composite layers may have at least one of 0 degree plies, +/−10 degree plies, +/−15 degree plies, +/−30 degree plies, +/−45 degree plies, +/−60 degree plies, +/−75 degree plies, or +/−90 degree plies. In some illustrative examples, base 618 may be formed of a composite laminate stack.

First buildup 620 is positioned on base 618 and adjacent to core 612. First buildup 620 contacts charge 626. First buildup 620 may be formed of a unidirectional composite material. In one illustrative example, the unidirectional fibers are substantially directed into the page in FIG. 6. In other words, the fibers of the unidirectional composite material are substantially parallel to the longitudinal axis of composite filler 610. In some illustrative examples, first buildup 620 may be formed by rolling a unidirectional tape in a jellyroll fashion. In other words, first buildup 620 may be formed by rolling a unidirectional tape into a spiral type cross-section. In some illustrative examples, first buildup 620 is a unidirectional extruded material.

Second buildup 622 is positioned on base 618 and adjacent to core 612. Second buildup 622 contacts charge 626. Second buildup 622 may be formed of a unidirectional composite material. Like first buildup 620, in some illustrative examples, second buildup 622 is formed by rolling a unidirectional tape in a jellyroll fashion. In some illustrative examples, second buildup 622 is a unidirectional extruded material.

Third buildup 624 is positioned on top 628 of charge 626. Third buildup 624 may be formed of a unidirectional composite material. Like first buildup 620, in some illustrative examples, third buildup 624 is formed by rolling a unidirectional tape in a jellyroll fashion. In some illustrative examples, third buildup 624 is a unidirectional extruded material.

Charge 626 is positioned covering core 612, base 618, first buildup 620, and second buildup 622. Charge 626 forms a portion of first side 611 and second side 613. As a result, charge 626 is adjacent to radius 604 of composite member 600 and radius 606 of composite member 602. Charge 626 is also adjacent to base 618.

Charge 626 is formed of a plurality of composite layers. The plurality of composite layers may have one or more ply orientations. Specifically, the plurality of composite layers may have at least one of 0 degree plies, +/−10 degree plies, +/−15 degree plies, +/−30 degree plies, +/−45 degree plies, +/−60 degree plies, +/−75 degree plies, or +/−90 degree plies. In some illustrative examples, charge 626 may be formed of a composite laminate stack.

Figure 7:
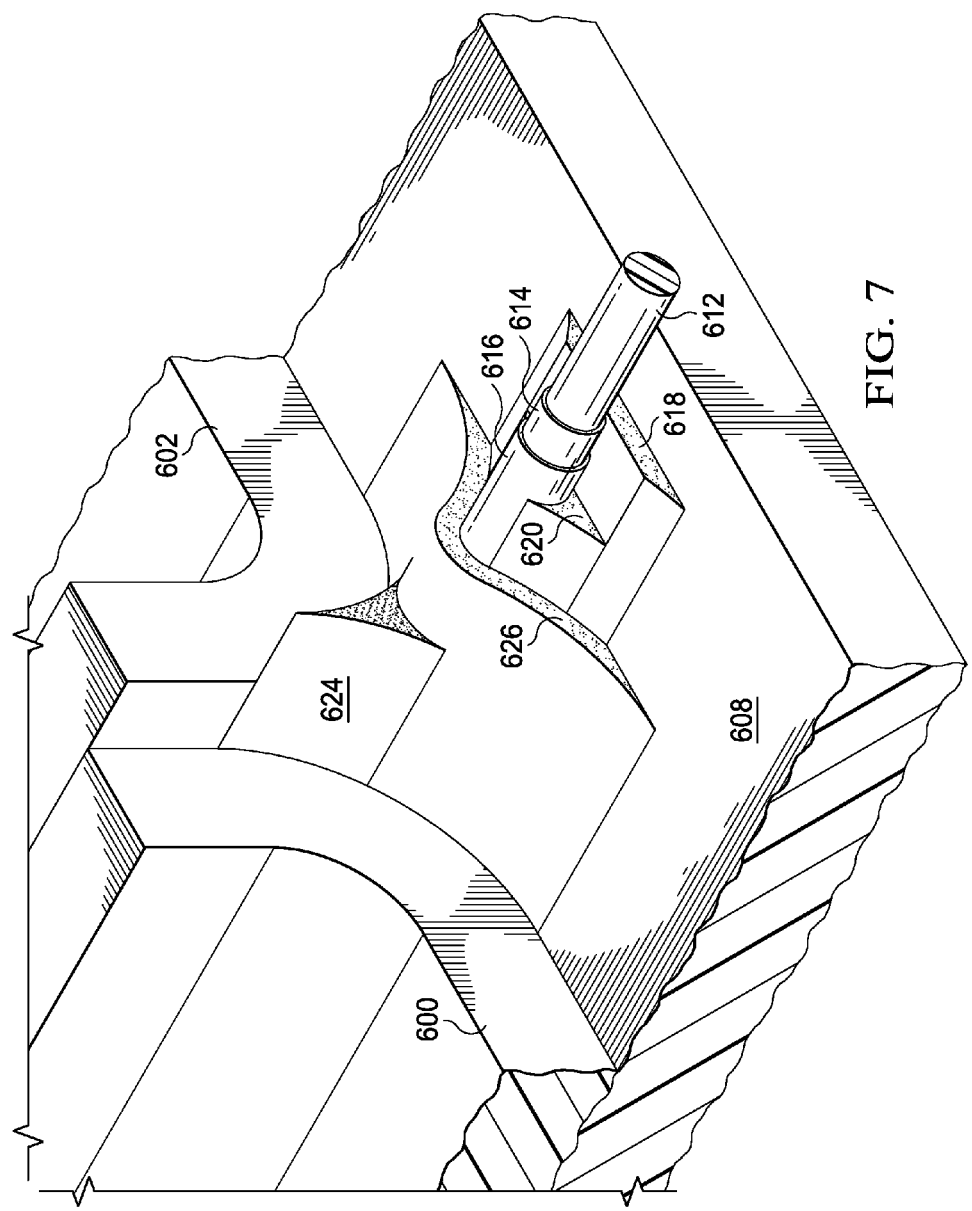
FIG. 7 is an illustration of a cut-away view of a composite filler and a number of composite members in accordance with an illustrative embodiment.

Turning now to FIG. 7, an illustration of a cut-away view of a composite filler and a number of composite members is depicted in accordance with an illustrative embodiment. Specifically, FIG. 7 is a cut-away view of composite member 600, composite member 602, composite member 608, and composite filler 610, of FIG. 6.

Figure 8:
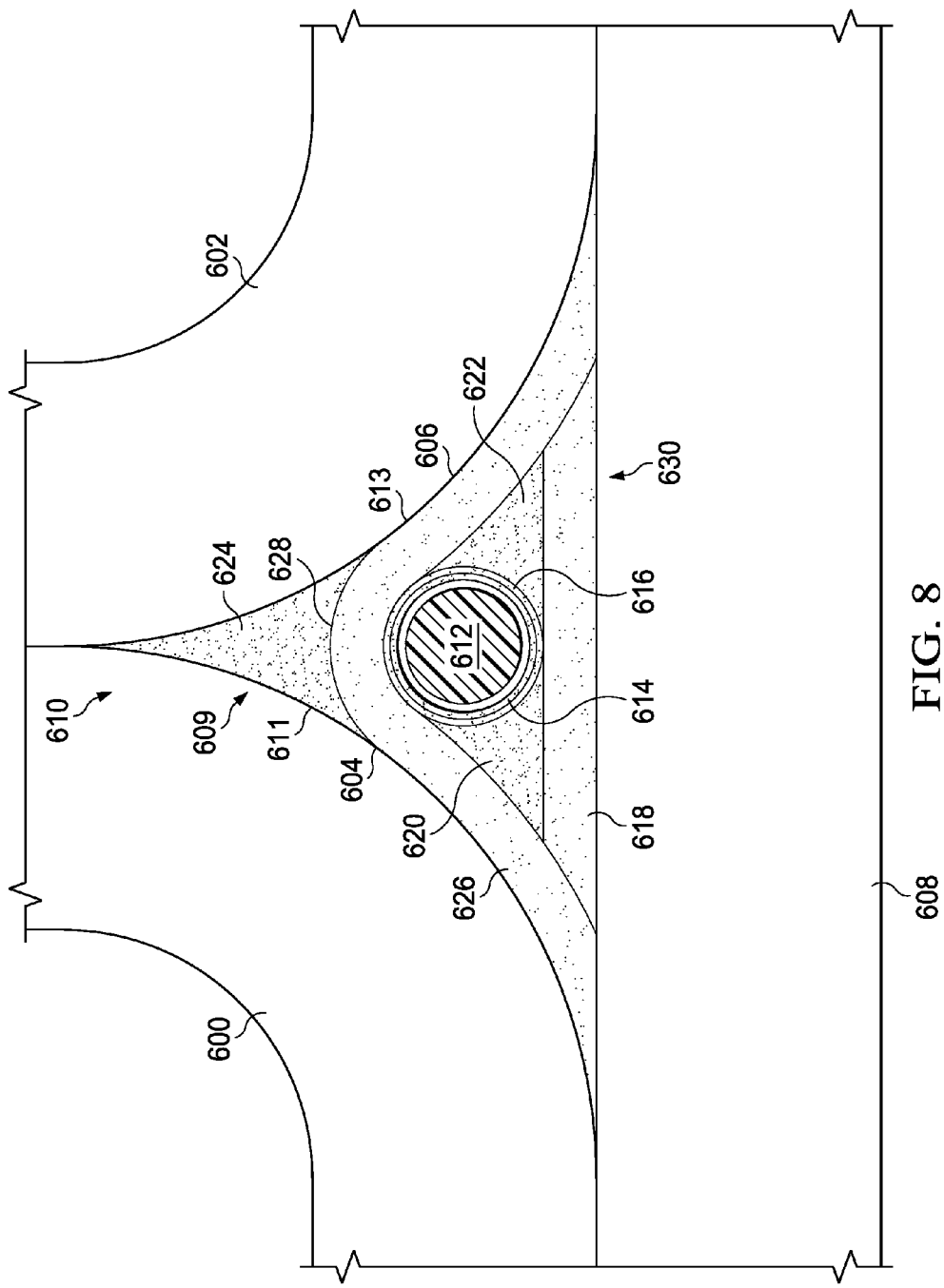
FIG. 8 is an illustration of a front view of a cured composite filler and a number of composite members in accordance with an illustrative embodiment.

Turning now to FIG. 8, an illustration of a front view of a cured composite filler and a number of composite members is depicted in accordance with an illustrative embodiment. Specifically, FIG. 8 is a view of composite member 600, composite member 602, composite member 608, and composite filler 610, after curing.

As can be seen from FIG. 8, core 612 sits in a hole of composite filler 610 following curing. The hole is formed by the expansion of core 612 during heating and contraction during cooling. Specifically, core 612 shrinks during cooling while first wrap 614 is restricted from shrinking by at least one of the cured resin and the fiber direction of the composite material.

As depicted, the hole has a substantially circular cross-section. Further, the hole extends longitudinally into composite filler 610 and extends into the page and thus may be substantially cylindrically shaped. The fiber orientation of at least one of first wrap 614 and second wrap 616 may discourage development of cracks along the hole in composite filler 610.

Figure 9:
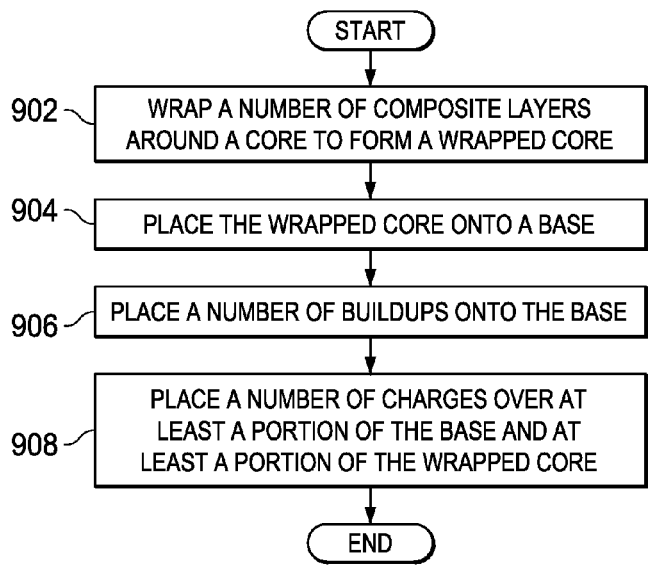
FIG. 9 is an illustration of a flowchart of a process for forming a composite filler in accordance with an illustrative embodiment.

Turning now to FIG. 9, an illustration of a flowchart of a process for forming a composite filler is depicted in accordance with an illustrative embodiment. The process illustrated in FIG. 9 may be implemented to form a composite filler such as composite filler 306 in FIG. 3 or composite filler 610 in FIG. 6.

As depicted, the process begins by wrapping a number of composite layers around a core to form a wrapped core (operation 902). The number of composite layers may be selected from at least one of composite fabric and composite tape. The core may be formed of a material which is non-bondable with the number of composite layers. In other illustrative examples, the core may be covered with a non-bondable material prior to wrapping the number of composite layers around the core.

The number of composite layers may be spirally wrapped around the core. In one illustrative example, the number of composite layers may be first wrap 314 and second wrap 316 of FIG. 3. The number of composite layers may also be referred to as a number of wraps. In some illustrative examples, the number of wraps comprise a number of layers of composite fabric.

The wrapped core is then placed onto a base (operation 904). The base is formed from multiple layers of composite material. The base may be base 318 of FIG. 3.

A number of buildups is then placed onto the base (operation 906). The number of buildups may be first buildup 320 and second buildup 322 of FIG. 3. The number of buildups is formed from unidirectional composite material. In some illustrative examples, the number of buildups is formed from unidirectional composite material in which fibers of the unidirectional composite material are substantially parallel to a longitudinal axis of the resulting composite filler. In some illustrative examples, the number of buildups is rolled from unidirectional composite material. The number of buildups may be positioned adjacent to the wrapped core if the wrapped core is already present on the base. In other illustrative examples, the number of buildups may be placed onto the base prior to placing the wrapped core onto the base.

A number of charges are then placed over at least a portion of the base and at least a portion of the wrapped core (operation 908), with the process terminating thereafter. In some examples, a single charge is placed over the base and the wrapped core. In this illustrative example, the number of charges may be charge 626 of FIG. 6. In some examples, a first charge is placed over half of the core and half of the base. A second charge is placed over the other half of the core and the other half of the base. In this illustrative example, the number of charges may be first charge 326 and second charge 328 in FIG. 3. The number of charges may be a number of stacks of composite material.

Figure 10:
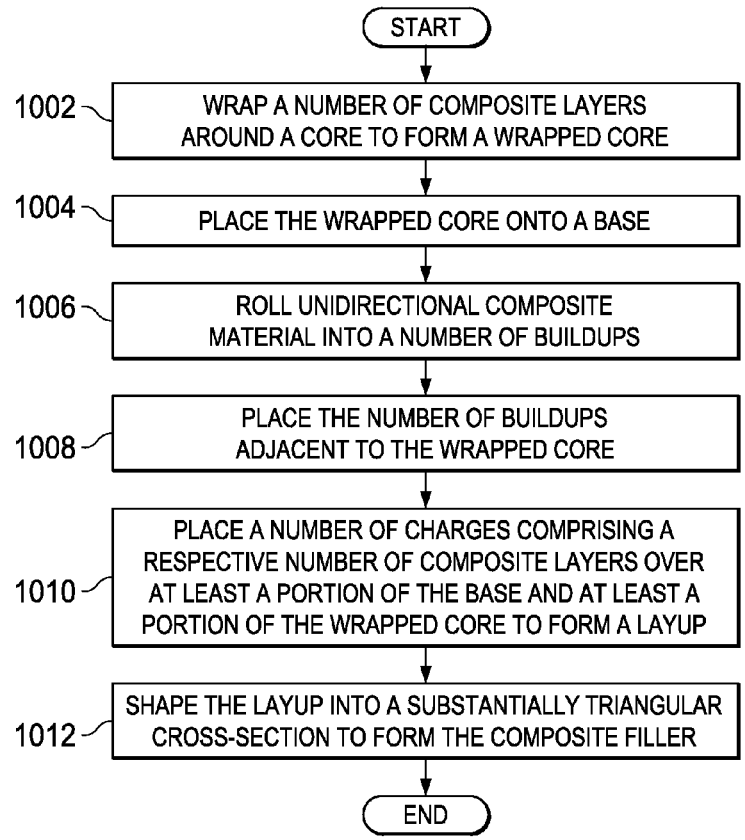
FIG. 10 is an illustration of a flowchart of a process for forming a composite filler in accordance with an illustrative embodiment.

Turning now to FIG. 10, an illustration of a flowchart of a process for forming a composite filler is depicted in accordance with an illustrative embodiment. The process illustrated in FIG. 10 may be implemented to form a composite filler such as composite filler 306 in FIG. 3.

The process begins by wrapping a number of composite layers around a core to form a wrapped core (operation 1002). The number of composite layers may be selected from at least one of composite fabric and composite tape. The core may be formed of a material which is non-bondable with the number of composite layers. In other illustrative examples, the core may be covered with a non-bondable material prior to wrapping the number of composite layers around the core.

The number of composite layers may be spirally wrapped around the core. In one illustrative example, the number of composite layers may be first wrap 314 and second wrap 316 of FIG. 3. The number of composite layers may also be referred to as a number of wraps.

The process then places the wrapped core onto a base (operation 1004). The base is formed from multiple layers of composite material. The base may be base 318 of FIG. 3.

Unidirectional composite material is then rolled into a number of buildups (operation 1006). In one illustrative example, the number of buildups may include third buildup 324 of FIG. 3. In other illustrative examples, the number of buildups may include first buildup 320 and second buildup 322.

The number of buildups are placed adjacent to the wrapped core (operation 1008). In one illustrative example, third buildup 324 is adjacent to the wrapped core in FIG. 3.

A number of charges comprising a respective number of composite layers is then placed over at least a portion of the base and at least a portion of the wrapped core to form a layup (operation 1010). One illustrative example can be seen from FIG. 3. In FIG. 3, first charge 326 and second charge 328 are each positioned over at least a portion of base 318 and over at least a portion of the wrapped core in FIG. 3. The number of charges may be a number of stacks of composite material.

The layup is then shaped into a substantially triangular cross-section to form the composite filler (operation 1012). The layup may be shaped using shaping equipment such as shaping equipment 1304 of FIG. 3. Afterwards the process terminates.

Figure 11:
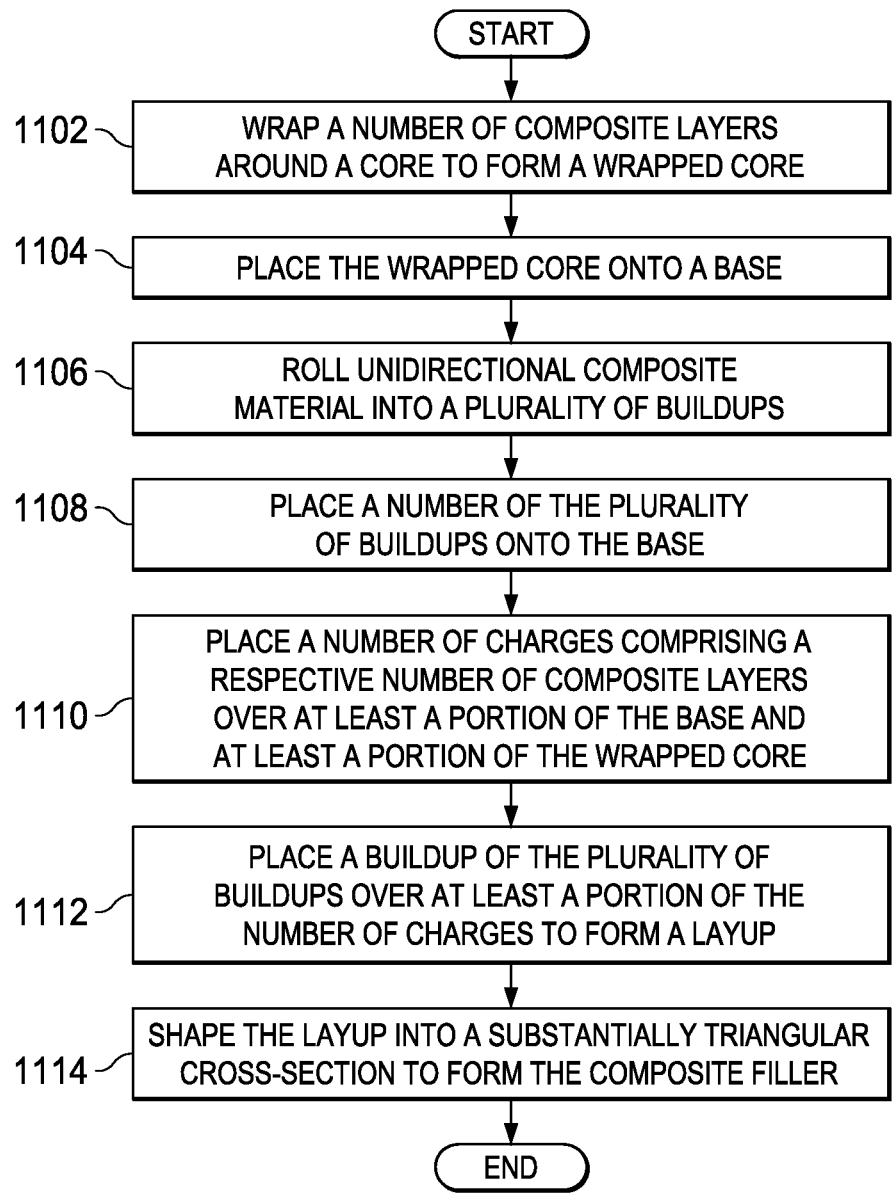
FIG. 11 is an illustration of a flowchart of a process for forming a composite filler in accordance with an illustrative embodiment.

Turning now to FIG. 11, an illustration of a flowchart of a process for forming a composite filler is depicted in accordance with an illustrative embodiment. The process illustrated in FIG. 11 may be implemented to form a composite filler such as composite filler 610 in FIG. 6.

The process begins by wrapping a number of composite layers around a core to form a wrapped core (operation 1102). The number of composite layers may be selected from at least one of composite fabric and composite tape. The core may be formed of a material which is non-bondable with the number of composite layers. In other illustrative examples, the core may be covered with a non-bondable material prior to wrapping the number of composite layers around the core.

The number of composite layers may be spirally wrapped around the core. In one illustrative example, the number of composite layers may be first wrap 614 and second wrap 616 of FIG. 6. The number of composite layers may also be referred to as a number of wraps.

The process then places the wrapped core onto a base (operation 1104). The base is formed from multiple layers of composite material. The base may be base 618 of FIG. 6.

Unidirectional composite material is rolled into a plurality of buildups (operation 1106). In one illustrative example, the plurality of buildups may include first buildup 620, second buildup 622, and third buildup 624 of FIG. 6.

A number of the plurality of buildups is placed onto the base (operation 1108). In one illustrative example, first buildup 620 and second buildup 622 are placed onto base 618 of FIG. 6.

A number of charges comprising a respective number of composite layers is placed over at least a portion of the base and at least a portion of the wrapped core (operation 1110). In one illustrative example, charge 626 is positioned over base 618 and core 612. The number of charges may be a number of stacks of composite material.

A buildup of the plurality of buildups is placed over at least a portion of the number of charges to form a layup (operation 1112). In one illustrative example, third buildup 624 is positioned over a portion of charge 626.

The layup is then shaped into a substantially triangular cross-section to form the composite filler (operation 1114). The layup may be shaped by applying pressure using tooling such as punches, rollers, dies, or other desirable tools. Afterwards the process terminates.

Figure 12:
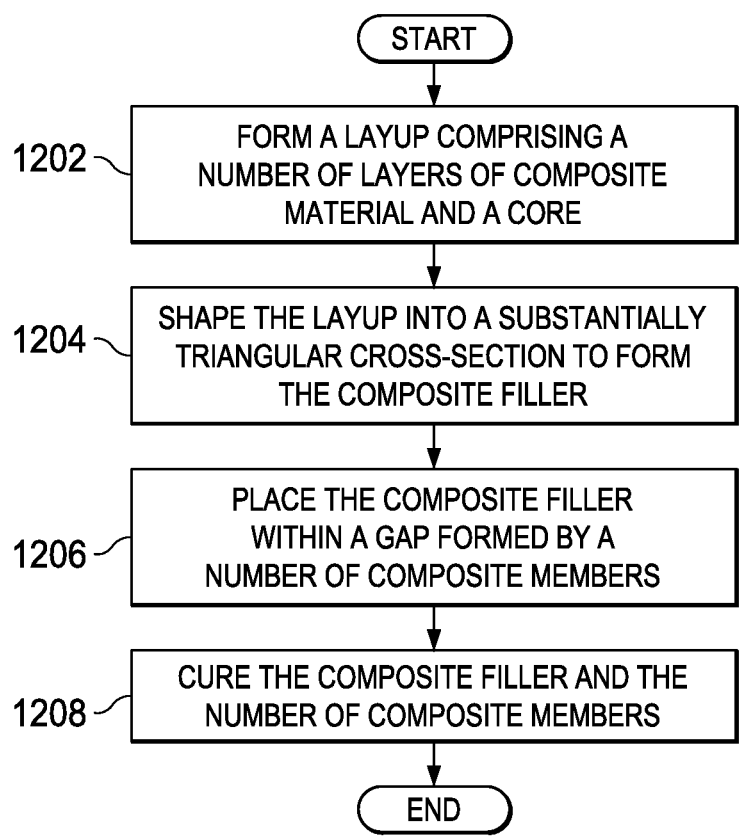
FIG. 12 is an illustration of a flowchart of a process for forming a structure in accordance with an illustrative embodiment.

Turning now to FIG. 12, an illustration of a flowchart of a process for forming a structure is depicted in accordance with an illustrative embodiment. The process begins by forming a layup comprising a number of layers of composite material and a core (operation 1202). In some illustrative examples, the core is formed of a non-composite material. In some illustrative examples, the core is formed of a material which is non-bondable with the composite material. In other illustrative examples, the core is wrapped in a material which is non-bondable with the composite material.

The process may then shape the layup into a substantially triangular cross-section to form a composite filler (operation 1204). The composite filler is placed within a gap formed by a number of composite members (operation 1206). In one illustrative example, the number of composite members includes two composite members such as composite member 300 and composite member 309 of FIG. 3. In one illustrative example, the number of composite members includes three composite members such as composite member 600, composite member 602, and composite member 608 of FIG. 6.

The composite filler and the number of composite members are cured (operation 1208). As the composite filler and the number of composite members are cured together, the composite filler and number of composite members are "co-cured." The process then terminates.

The illustrations of the fillers and composite members in FIGS. 2-8 are not meant to imply physical or architectural limitations to the manner in which an illustrative embodiment may be implemented.

Figure 13:
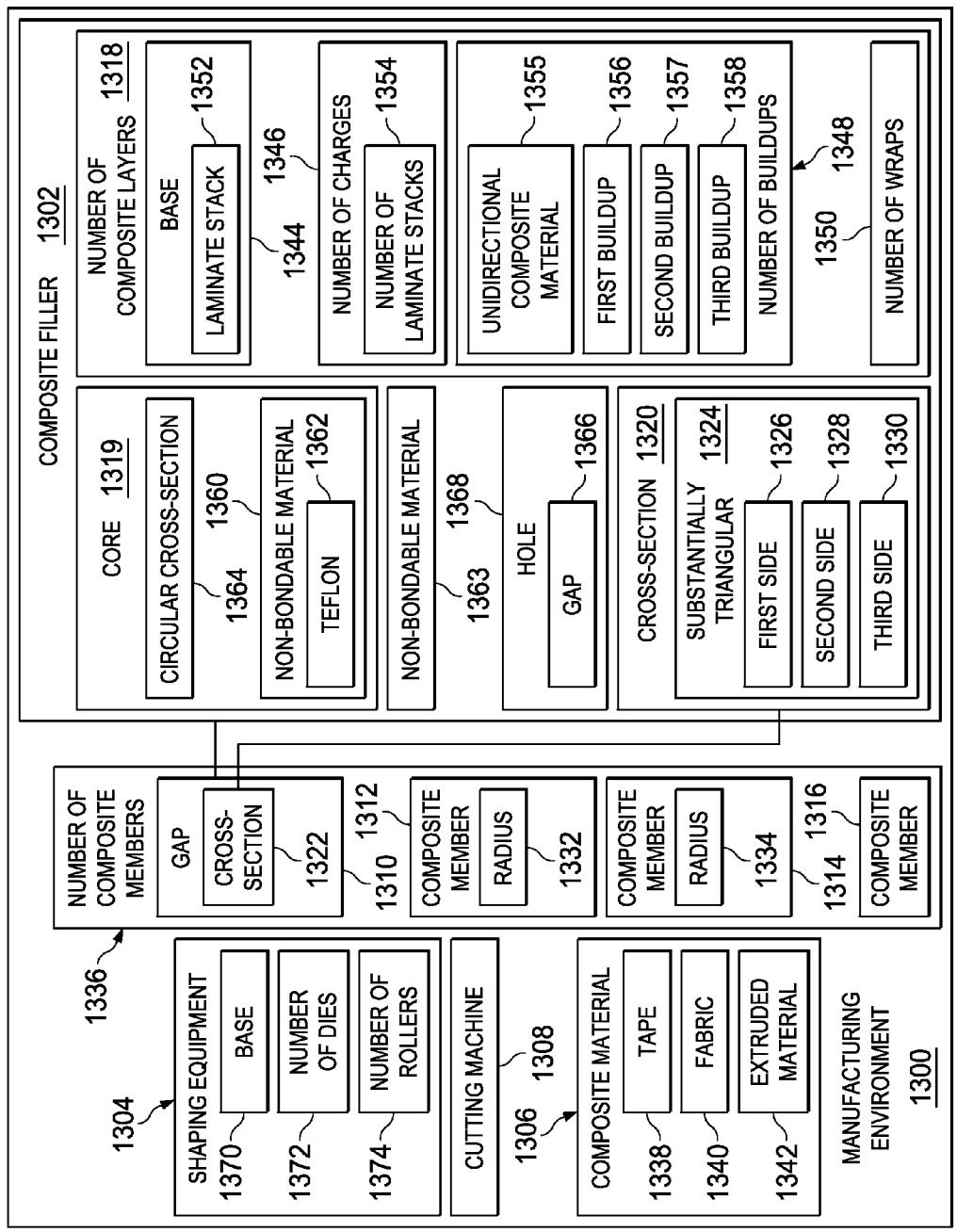
FIG. 13 is an illustration of a block diagram of a manufacturing environment in accordance with an illustrative embodiment.

Turning now to FIG. 13, an illustration of a block diagram of a manufacturing environment is depicted in accordance with an illustrative embodiment. Manufacturing environment 1300 in FIG. 13 is an example of a physical implementation of manufacturing environment 1300 shown in block form in FIG. 13.

Manufacturing environment 1300 comprises composite filler 1302, shaping equipment 1304, composite material 1306, and cutting machine 1308. Composite filler 1302 may be configured to be placed in gap 1310 formed by composite member 1312, composite member 1314, and composite member 1316.

Composite filler 1302 comprises number of composite layers 1318 and core 1319. Composite filler 1302 has cross-section 1320. Cross-section 1320 may be configured to fit within cross-section 1322 of gap 1310. In some illustrative examples, cross-section 1320 may be substantially triangular 1324. Substantially triangular 1324 cross-section 1320 has first side 1326, second side 1328, and third side 1330. First side 1326 of composite filler 1302 may contact composite member 1312. In some illustrative examples, composite member 1312 may have radius 1332. In these illustrative examples, first side 1326 of composite filler 1302 may follow radius 1332.

Second side 1328 of composite filler 1302 may contact composite member 1314. In some illustrative examples, composite member 1314 may have radius 1334. In these illustrative examples, second side 1328 of composite filler 1302 may follow radius 1334.

Third side 1330 may contact composite member 1316 of number of composite members 1336. Number of composite members 1336 includes composite member 1312, composite member 1314, and composite member 1316.

Number of composite layers 1318 may be formed of composite material 1306. Composite material 1306 may include tape 1338, fabric 1340, and extruded material 1342.

Number of composite layers 1318 includes base 1344, number of charges 1346, number of buildups 1348, and number of wraps 1350. Base 1344 forms at least a portion of third side 1330 of cross-section 1320 of composite filler 1302. In this illustrative example, cross-section 1320 is substantially triangular 1324. Base 1344 may be formed of laminate stack 1352.

Laminate stack 1352 is a stack of multiple layers of tape 1338. Laminate stack 1352 has one or more ply orientations. Specifically, laminate stack 1352 may have at least one of 0 degree plies, +/−10 degree plies, +/−15 degree plies, +/−30 degree plies, +/−45 degree plies, +/−60 degree plies, +/−75 degree plies, or +/−90 degree plies. In other words, base 1344 may be a base laminate stack 1352 having an associated plurality of layers of composite material having an associated plurality of ply orientations.

Number of charges 1346 may be formed of number of laminate stacks 1354. Number of laminate stacks 1354 is a number of stacks of multiple layers of tape 1338. Number of laminate stacks 1354 has one or more ply orientations. In other words, number of charges may be a number of stacks of composite material.

Number of charges 1346 forms at least a portion of first side 1326 and second side 1328 of cross-section 1320. Number of charges 1346 is positioned adjacent to number of buildups 1348. Number of buildups 1348 may fill in the remaining portions of cross-section 1320 not filled by base 1344, number of charges 1346, number of wraps 1350, or core 1319.

Number of buildups 1348 may be formed of unidirectional composite material 1355. In one illustrative example, fibers in unidirectional composite material 1355 are substantially parallel to the longitudinal axis of composite filler 1302. In some illustrative examples, number of buildups 1348 may be formed by rolling a unidirectional tape in a jellyroll fashion. In other words, number of buildups 1348 may be formed by rolling a unidirectional tape into a spiral type cross-section. In some illustrative examples, number of buildups 1348 is a unidirectional extruded material.

In some illustrative examples, number of buildups 1348 may include first buildup 1356, second buildup 1357, and third buildup 1358. In some illustrative examples, first buildup 1356 and second buildup 1357 are positioned on base 1344 and adjacent to core 1319. Third buildup 1358 may be positioned on at least one of number of charges 1346 and core 1319.

Core 1319 may be formed of non-bondable material 1360. Non-bondable material 1360 is a material which does not bond to composite material 1306. Nonbondable material 1360 may be a polymer or other desirable material. When core 1319 is formed of nonbondable material 1360, number of wraps 1350 may not adhere to core 1319 following curing. In some illustrative examples, non-bondable material 1360 may be TEFLON® (polytetrafluoroethylene) 1362. In other illustrative examples, core 1319 need not be formed of non-bondable material 1360, but may instead be substantially surrounded by non-bondable material 1363. In some illustrative examples, nonbondable material 1363 may be in contact with core 1319. In other illustrative examples, additional layers may be present between non-bondable material 1363 and core 1319.

Core 1319 may be substantially surrounded by number of composite layers 1318. Specifically, number of wraps 1350 may be wrapped around core 1319 in forming composite filler 1302. In some illustrative examples, number of wraps 1350 are a number of layers of composite fabric such as fabric 1340.

In forming composite filler 1302, number of wraps 1350 surround core 1319 forming a wrapped core. Number of wraps 1350 may be a number of composite materials spirally wrapped around core 1319.

In some illustrative examples, number of wraps 1350 is a composite fabric spirally wrapped around core 1319. In one example, a wrap of number of wraps 1350 may be a −45 degree wrap. Specifically, in this example, a wrap of number of wraps 1350 may be a woven composite fabric spirally wrapped at a −45 degree angle around core 1319. In another illustrative example, a wrap of number of wraps 1350 may be a unidirectional material wrapped spirally around core 1319.

By spirally wrapping number of wraps 1350 around core 1319, cracks may be discouraged. Specifically, wrapping number of wraps 1350 may reduce the likelihood that cracks may form in composite filler 1302. By spirally wrapping number of wraps 1350, any stress concentrations adjacent to core 1319 will be discouraged from initiating cracks by the layers of continuous composite fibers contained in number of wraps 1350.

When number of wraps 1350 is a woven composite fabric, this woven material may further discourage cracks from forming. Woven composite fabrics have a lower modulus of elasticity than non-woven composite materials. This lower modulus of elasticity may also be referred to as the woven composite fabric being structurally "softer." This lower modulus of elasticity may allow for a greater amount of distortion in number of wraps 1350 prior to the initiation of cracks. This lower modulus of elasticity of the woven material may result in a "spring effect." A "spring effect" may allow strain from thermal and chemical shrinkage effects to be absorbed without causing the initiation of a crack. Further, this lower modulus of elasticity may allow for a greater amount of distortion in composite filler 1302 prior to the initiation of cracks.

Core 1319 may have circular cross-section 1364. Circular cross-section 1364 may aid in the removal of core 1319 from composite filler 1302 following curing. During curing, composite filler 1302 may be heated and then cooled. During the heating step, core 1319 expands, applying a compressive force against number of composite layers 1318. During the cooling step, core 1319 shrinks. However, number of wraps 1350 is restricted from shrinking. As a result, following the curing of composite filler 1302, gap 1366 is formed between number of composite layers 1318 and core 1319. Gap 1366 is a portion of hole 1368 in number of composite layers 1318 not filled by core 1319. An edge of hole 1368 is formed by number of wraps 1350 surrounding hole 1368.

Hole 1368 will have substantially the same cross-section as the cross-section of core 1319. When hole 1368 has a substantially circular cross-section, the likelihood of cracking may be reduced. Thus, circular cross-section 1364 of core 1319 may reduce the likelihood of cracking due to hole 1368. In some illustrative examples in which hole 1368 has circular cross-section 1364, hole 1368 may also be described as having a substantially cylindrical shape.

After curing, core 1319 may be removed from number of composite layers 1318. Removing core 1319 leaves hole 1368 in composite filler 1302 empty. Removing core 1319 may reduce the weight of composite filler 1302.

Cross-section 1320 of composite filler 1302 may be formed from composite material 1306 using shaping equipment 1304. Shaping equipment 1304 may include base 1370 and number of dies 1372. In some illustrative examples, shaping equipment 1304 may include number of rollers 1374 instead of plurality of dies 1372. In some illustrative examples, after positioning number of composite layers 1318, cross-section 1320 of composite filler 1302 may be formed using shaping equipment 1304.

The illustration of manufacturing environment 1300 in FIG. 13 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, manufacturing environment 1300 may not include composite member 1314. In this example, composite member 1312 and composite member 1316 may form gap 1310.

In another example, in forming composite filler 1302, core 1319 may not be formed of non-bondable material 1360. In this example, there may be an additional layer between core 1319 and number of wraps 1350. The additional layer may be formed of a peel ply or other non-bondable material.

Figure 14:
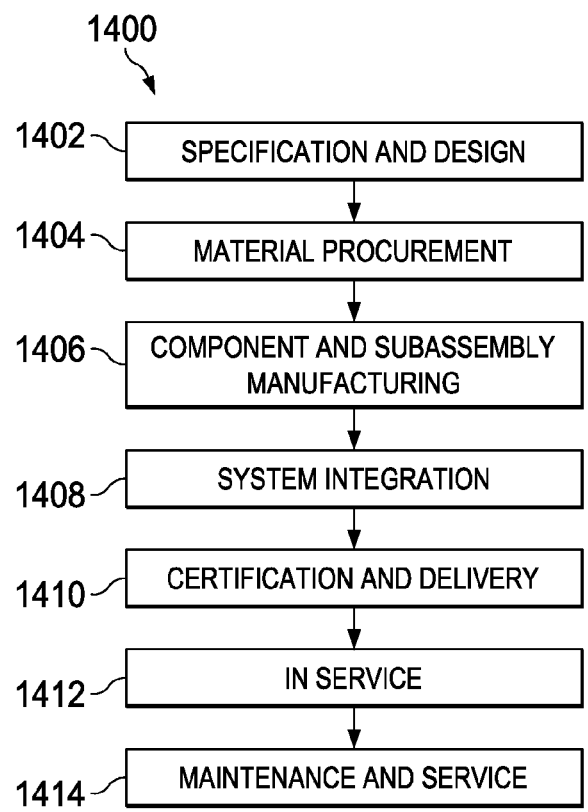
FIG. 14 is an illustration of a block diagram of an aircraft manufacturing and service method in accordance with an illustrative embodiment.
Figure 15:
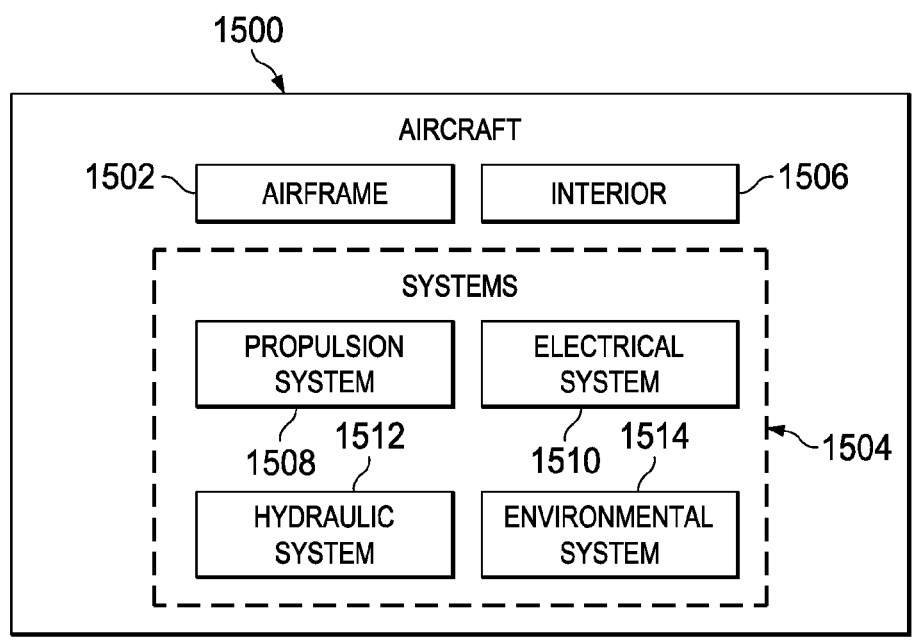
FIG. 15 is an illustration of a block diagram of an aircraft in which an illustrative embodiment may be implemented.

Illustrative embodiments of the disclosure may be described in the context of aircraft manufacturing and service method 1400 as shown in FIG. 14 and aircraft 1500 as shown in FIG. 15. Turning first to FIG. 14, an illustration of a block diagram of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 may go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of a block diagram of an aircraft is depicted in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14. One or more illustrative embodiments may be used during component and subassembly manufacturing 1406. For example, composite filler 1302 in FIG. 13 may be used during component and subassembly manufacturing 1406. Further, composite filler 1302 may also be used to perform replacements during maintenance and service 1414.

Thus, the illustrative embodiments provide a method and apparatus for forming a composite filler. By forming a composite filler using a core, a hole may be formed in the composite filler. The composite filler having the hole may have a lower likelihood of cracking. When a number of wraps forms the edge of the hole, the wraps may discourage cracking at the hole edge. Further, by removing the core after curing, the composite filler may have a reduced weight.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. For example, an additional buildup may be placed over at least a portion of the wrapped core. As another example, a buildup may be placed over at least a portion of the number of charges. Further, some blocks may not be implemented.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
    forming a layup comprising a number of layers of composite material and a core comprising a material which is non-bondable with the composite material;
    shaping the layup into a substantially triangular cross-section to form a composite filler;
    placing the composite filler within a gap formed by a number of composite members; and
    curing the composite filler and the number of composite members.

2. The method of claim 1, wherein the number of layers of composite material comprise a base, a number of buildups, a number of charges, and a number of wraps surrounding the core to form a wrapped core.

3. The method of claim 1 further comprising:
    removing the core after curing the composite filler and the number of composite members.

4. A method comprising:
wrapping a number of composite layers around a core to form a wrapped core;
placing the wrapped core onto a base;
placing a number of buildups adjacent to the wrapped core; and
placing a number of charges over at least a portion of the base and at least a portion of the wrapped core to form a layup; and
shaping the layup into a substantially triangular cross-section to form a composite filler.

5. The method of claim 4 further comprising:
rolling unidirectional composite material to form the number of buildups.

6. The method of claim 4, further comprising:
placing the composite filler within a gap formed by a number of composite members; and
curing the composite filler.

7. The method of claim 6, wherein the composite filler and the number of composite members are co-cured.

8. The method of claim 4 further comprising:
placing a buildup over at least a portion of the number of charges to form a layup.

9. The method of claim 8 further comprising:
shaping the layup into a substantially triangular cross-section to form a composite filler.

* * * * *